United States Patent
Ho (10) Patent No.: US 7,213,899 B2
(45) Date of Patent: May 8, 2007

(54) MEMORY USE AND MANAGEMENT METHOD AND SYSTEM FOR A MULTI-PASS PRINTER

(75) Inventor: Wen-Cheng Ho, Shigang Shiang (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 394 days.

(21) Appl. No.: 10/983,597

(22) Filed: Nov. 9, 2004

(65) Prior Publication Data

US 2005/0141031 A1 Jun. 30, 2005

(30) Foreign Application Priority Data

Dec. 24, 2003 (TW) .............................. 92136734 A (51) Int. Cl.
*B41J 2/145* (2006.01)
(52) U.S. Cl. ........................... 347/15; 347/41; 358/1.9; 358/1.16
(58) Field of Classification Search ................. 347/15, 347/41, 1.9, 1.2, 1.16
See application file for complete search history.

(56) References Cited

U.S. PATENT DOCUMENTS

| 5,831,642 | A | * | 11/1998 | Matsubara et al. ............. 347/9 |
| 6,779,873 | B2 | * | 8/2004 | Maeda et al. .................. 347/43 |
| 2005/0174602 | A1 | * | 8/2005 | Saito ......................... 358/1.16 |

* cited by examiner

*Primary Examiner*—Lamson Nguyen
(74) *Attorney, Agent, or Firm*—Bacon & Thomas, PLLC (57) ABSTRACT

A memory use and management method and system for a multi-pass printer. The system has a band buffer, a band buffer manager and a print engine. The band buffer receives and masks an input data, and stores masked data resulting from masking the input data. The band buffer manager is connected to the band buffer in order to start to print the masked data as the band buffer stores an amount of one complete print pass for a printhead of the printer. The print engine has the printhead and is connected to the band buffer such that the print engine receives the masked data from the band buffer and prints it by the printhead. Data amount stored in the band buffer can be represented by an equation, $[(1+2+3+ \ldots +j+j)/(i*j)]*S$, where j indicates partitioned number of one complete print, and S indicates data amount required by one complete print.

3 Claims, 13 Drawing Sheets

|        | 1st Pass | 2nd Pass | 3rd Pass | 4th Pass | 1st Pass | 2nd Pass | 3rd Pass | 4th Pass |
|--------|----------|----------|----------|----------|----------|----------|----------|----------|
| mem1   | B1P1     | B1P1     | B1P1     | X        | B6P1     | B6P1     | B6P1     | B6P1     |
| mem2   | B1P2     | B1P2     | X        | B5P1     | B5P1     | B5P1     | B5P1     | X        |
| mem3   | B1P3     | X        | B4P3     | B4P3     | X        | B7P1     | B7P1     | B7P1     |
| mem4   | X        |          | B4P4     | X        | B6P2     | B6P2     | B6P2     | X        |
| mem5   | B2P1     | B2P1     | B2P1     | B2P1     | X        | B7P2     | B7P2     | B7P2     |
| mem6   | B2P2     | B2P2     | B2P2     | X        | B6P3     | B6P3     | X        | B9P1     |
| mem7   | B2P3     | B2P3     | X        | B5P2     | B5P2     | B5P2     | X        | B9P2     |
| mem8   | B2P4     | X        | B3P1     | B5P3     | B5P3     | X        | B8P1     | B8P1     |
| mem9   |          | B3P1     | B3P2     | B3P1     | B3P1     | X        | B8P2     | B8P2     |
| mem10  |          | B3P2     | B3P3     | B3P2     | X        | B7P3     | B7P3     | X        |
| mem11  |          | B3P3     | X        | B5P4     | B6P4     | X        | B8P3     | B8P3     |
| mem12  |          | B3P4     | B4P1     | B4P1     | X        | B7P4     | X        | B9P3     |
| mem13  |          |          | B4P2     | B4P2     | B4P1     | B4P1     | X        | B9P4     |
| mem14  |          |          |          |          | B4P2     | X        | B8P4     | X        |

| | 1st Pass | 2nd Pass | 3rd Pass | 4th Pass | 1st Pass | 2nd Pass | 3rd Pass | 4th Pass |
|---|---|---|---|---|---|---|---|---|
| | Mask1 | Mask2 | Mask3 | Mask4 | Mask1 | Mask2 | Mask3 | Mask4 |
| mem1 | X | | | B4P3 | B4P3 | B4P3 | Mask3 | B9P1 |
| mem2 | B1P2 | X | B4P4 | X | B6P1 | B6P1 | B6P1 | B6P1 |
| mem3 | B1P3 | B1P3 | X | B5P1 | X | B7P1 | B7P1 | B7P1 |
| mem4 | B1P4 | B1P4 | B1P4 | X | B6P2 | X | B8P1 | B8P1 |
| mem5 | B2P1 | B2P1 | B2P1 | B2P1 | X | B7P2 | B7P2 | B7P2 |
| mem6 | B2P2 | X | | B5P2 | B5P2 | X | B8P2 | B8P2 |
| mem7 | B2P3 | B2P3 | X | B5P3 | B5P3 | B5P3 | X | B9P2 |
| mem8 | B2P4 | B2P4 | B2P4 | X | B6P3 | B6P3 | X | B9P3 |
| mem9 | | B3P1 | B3P1 | B3P1 | X | B7P3 | X | B9P4 |
| mem10 | | B3P2 | B3P2 | B3P2 | B3P2 | X | B8P3 | B8P3 |
| mem11 | | B3P3 | X | B5P4 | B5P4 | B5P4 | B5P4 | X |
| mem12 | | B3P4 | B4P1 | B4P1 | B4P4 | B4P4 | B4P4 | X |
| mem13 | | | B4P2 | B4P2 | X | B7P4 | B7P4 | X |
| mem14 | | | B4P2 | B4P2 | B4P2 | X | B8P4 | X |

FIG. 13

MEMORY USE AND MANAGEMENT METHOD AND SYSTEM FOR A MULTI-PASS PRINTER

BACKGROUND OF THE INVENTION

1. Field of the Invention

The present invention relates to the technical field of dynamic random access memory (DRAM) management and, more particularly, to a memory use and management method and system for a multi-pass printer.

2. Description of Related Art

For a printer system at single-pass print, a printhead has to complete data print by single-pass, i.e., all required print positions are done. However, when the printhead requires successive printing for print dots at successive positions, the print dots may be distorted in shapes or sizes, and neighbor print dots may be out of focus due to short dried time so as to affect print quality.

To overcome the aforementioned problem, one solution applies multi-pass printing that printhead prints required data by several times. A printer can have modes of four-pass, eight-pass, etc. Multi-pass printing has advantages that shapes and sizes of successive print dots are not distorted in successive printing and neighbor print dots have longer dried time so as not to be out of focus and affect print quality. Thus, multi-pass printing can have better print quality.

However, multi-pass printing still has several defects. For example, for a four-pass mode, input data is divided into four times to print. In this case, if paper is fed in by a height of a printhead, required buffer is a size capable of storing data amount of two complete prints since printhead cannot be stopped to wait for next printing data to be completely filled up.

Figure 1:
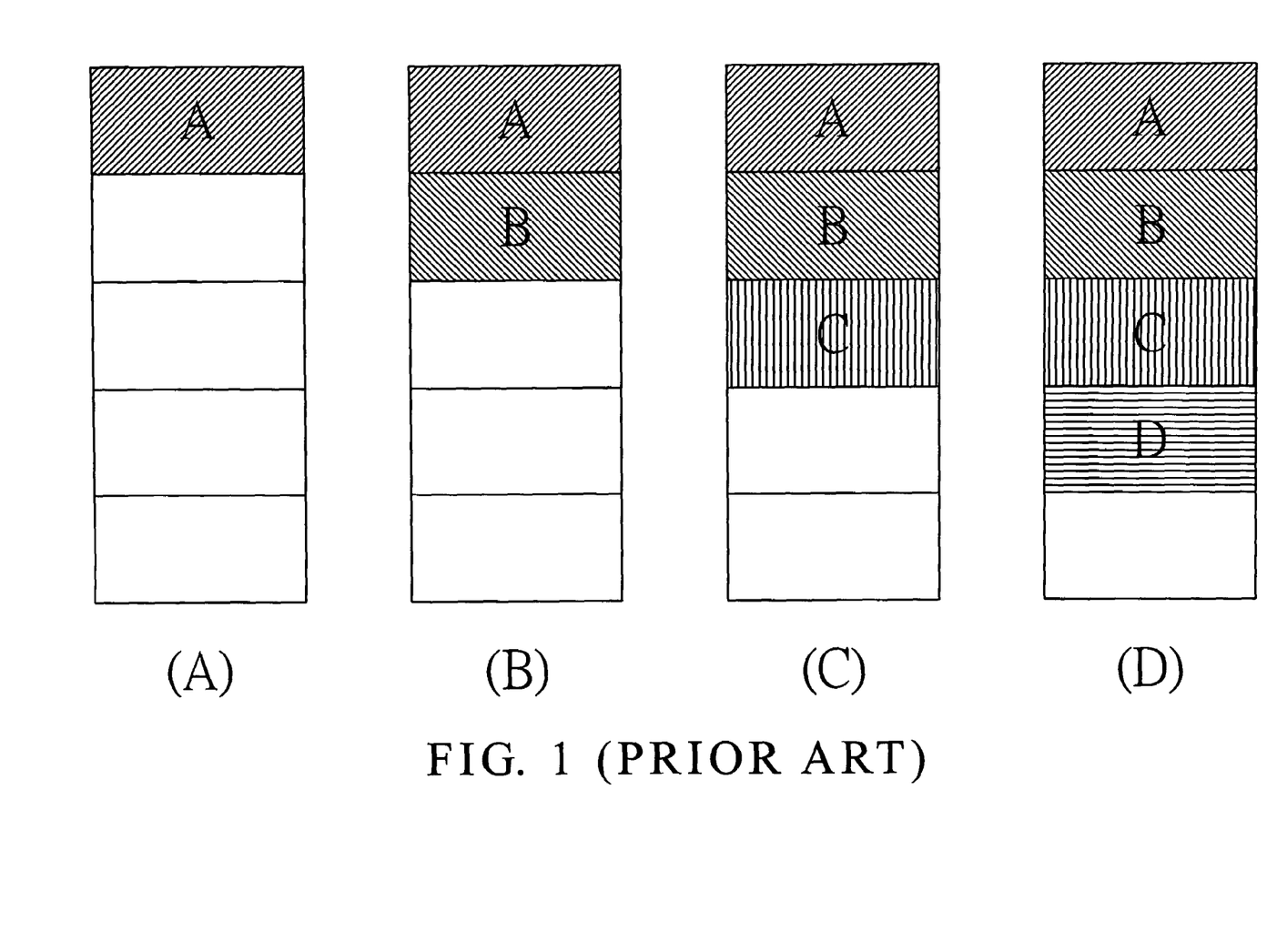
FIG. 1 is a graph of memory use in a typical multi-pass printer.

To overcome the problem in requiring a large buffer, U.S. Pat. No. 6,313,922 granted to Jackson, et al for an "Efficient use of a printhead and a compressed swath buffer in an inkjet printer" discloses a solution that a multi-pass printer can effectively use buffer to save memory use. If inkjet head of a printer has a height F as 100 (i.e., 100 inkjet holes) and four inkjet prints (four-pass, N=4), paper is fed in F/4 (25 inkjet holes) that is at a height of ¼ printhead. In this case, buffer is used as shown in FIGS. 1(A)–(D).

As shown in FIG. 1(A), 125 rows of data are stored in buffer. When inkjet head of a printer starts to move from right to left, upon first 25 rows of data (area indicated by A) as first pass, partial data in first 25 rows is used. As shown in FIG. 1(B), when paper for printing is fed in 25 rows and the inkjet head starts to move from right to left, upon first 25 rows of data as second pass, partial data in first 25 rows is used while upon 26 to 50 rows of data (area indicated by B) as first pass, partial data in 26 to 50 rows are used. Accordingly, the similarity is shown in FIGS. 1(C) and 1(D).

In FIG. 1(D), upon first 25 rows of data as fourth pass (the last one pass), first 25 rows of data are all used and thus discarded. In this case, 26 to 50 rows of data as third pass substitutes first 25 rows of data, 51 to 75 rows of data (area indicated by C) as second pass substitutes 26 to 50 rows of data, 76 to 100 rows of data (area indicated by D) as first pass substitutes 51 to 75 rows of data, and 101 to 125 rows of data substitutes 76 to 100 rows of data. However, if 101 to 125 rows of data cannot be filled up on time, inkjet head has to stop next swath printing until printing data is filled up.

Figure 2:
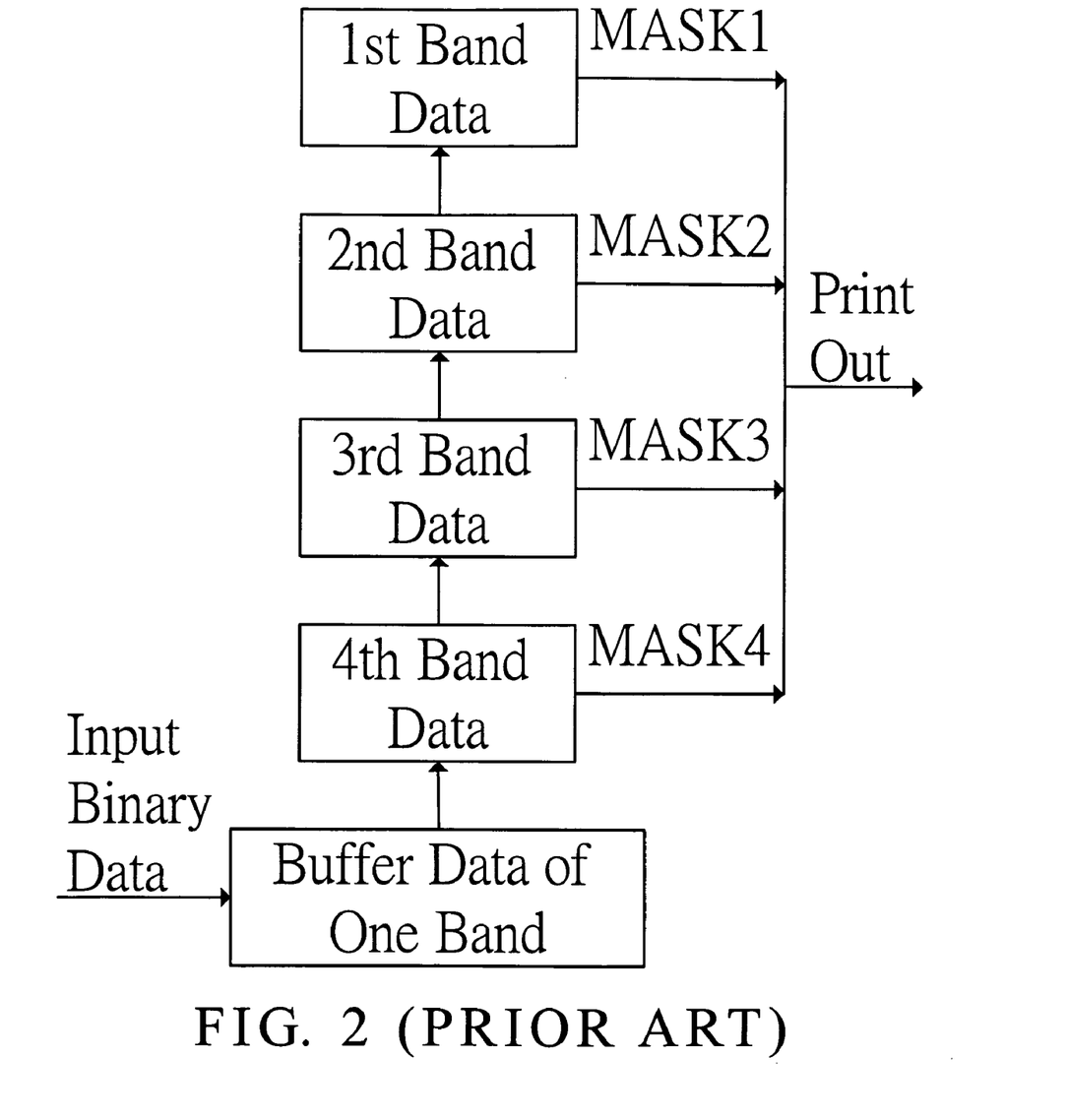
FIG. 2 is a schematic diagram illustrating a memory use and masking operation in a typical multi-pass printer.

In U.S. Pat. No. 6,313,922, each pass only prints partial data. In FIG. 1(A), because partial data in first 25 rows is used upon first 25 rows of data (area indicated by A) as first pass, masking is applied for determining which data is printed for use. FIG. 2 is a schematic diagram illustrating a multi-pass memory use and masking operation configured in U.S. Pat. No. 6,313,922. As shown, paper is fed in F/4 (25 inkjet holes) height after each print, i.e., going forward 1/N (N=4) swath in height, and thus use amount of memory is reduced to (1+1/N) swath of data amount, such that required buffer size is relatively reduced to 5/4 swath of data amount because only 1/N swath of data amount is required.

However, as cited, partial data in first 25 rows is used at first pass upon first 25 rows of data (area indicated by A) and stored in buffer until four passes are complete, and then discarded. Such a management wastes used buffer and is not optimized.

Therefore, it is desirable to provide an improved memory use and management method and system for a multi-pass printer to mitigate and/or obviate the aforementioned problems.

SUMMARY OF THE INVENTION

The object of the invention is to provide a memory use and management method and system for a multi-pass printer system, which can increase use and management efficiency of a printer buffer and also reduce buffer number for use, thereby reducing printer hardware cost.

In accordance with one aspect of the present invention, there is provided a memory use and management method for a multi-pass printer. The method includes a data receiving step, a masking step, a buffering step, a print starting step, a reverse masking step and a data excluding step. The data receiving step uses the printer to receive input data to be printed through an interface. The masking step uses a mask to mask the input data received by the printer, thereby generating a masked data. The buffering step buffers the masked data, thereby forming a buffering data. The print starting step starts to print the buffering data when having appropriate amount for one pass print by a printhead of the printer. The reverse masking step reconstructs the buffering data to the input data for print in accordance with the mask used in the masking step. The data excluding step excludes the buffering data that is reconstructed and printed in the reverse masking step, and returns to the data receiving step to perform continuously until all data is printed completely.

In accordance with another aspect of the present invention, there is provided a multi-pass printer system, which has a band buffer, a band buffer manager and a print engine. The band buffer receives and masks an input data to be printed, and stores masked data resulting from masking the input data. The band buffer manager is connected to the band buffer in order to start to print the masked data as the band buffer stores appropriate amount for one swath print by a printhead. The print engine has the printhead and is connected to the band buffer such that the print engine receives the masked data from the band buffer and prints it by the printhead.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
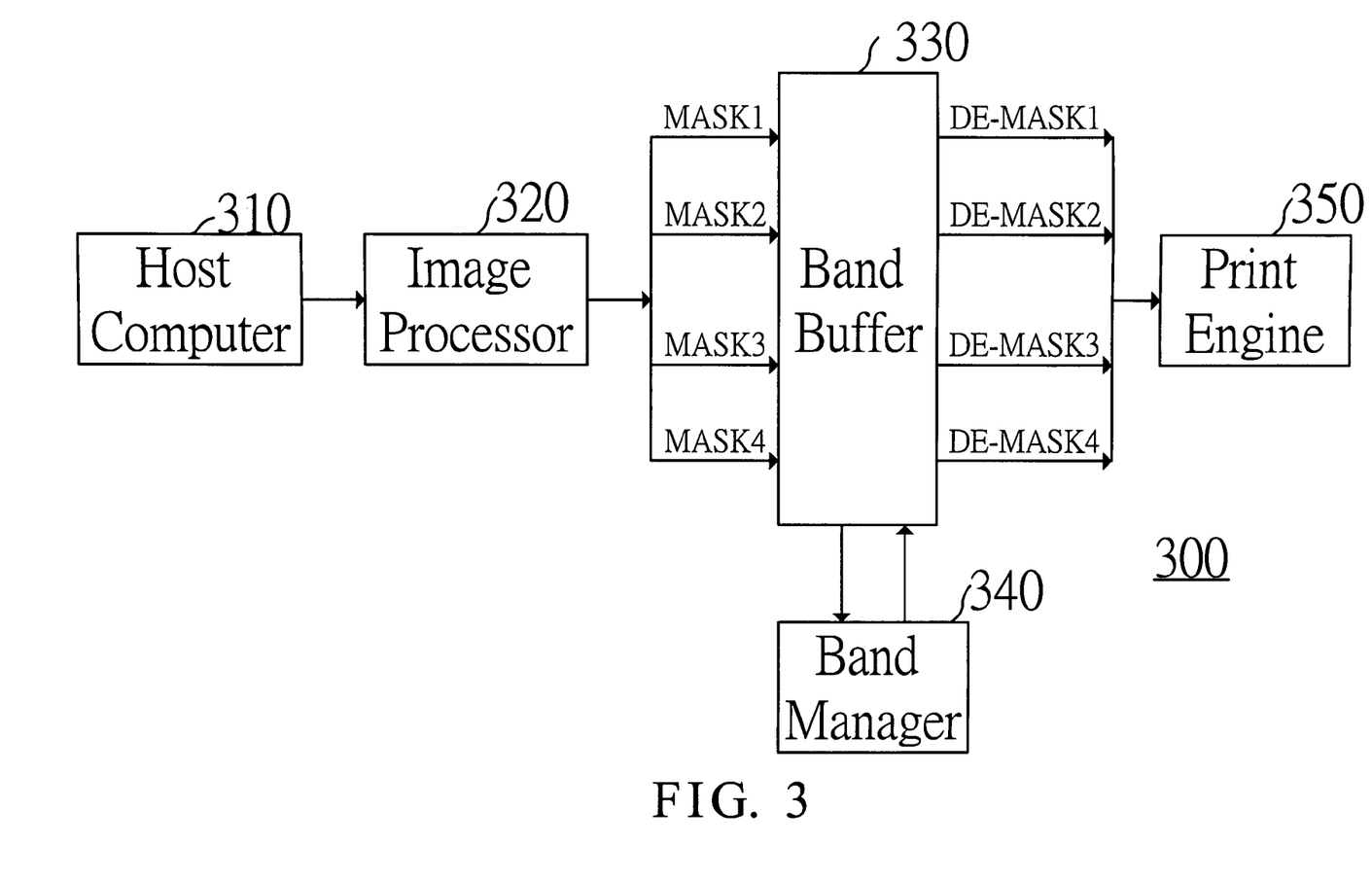
FIG. 3 is a block diagram of a multi-pass printer system in accordance with the invention.

FIG. 3 is a block diagram of a multi-pass printer system in accordance with the invention. The system 300 includes a host 310, an image processor 320, a band buffer 330, a band buffer manager 340 and a print engine 350. The host 310 can be a personal computer (PC) or workstation with a screen to display pictures for communication with a user. To print a picture that is displayed on the screen, the host 310 sends the picture data to the image processor 320 for conversion RGB format into CMYK format and producing halftone data to print. The image processor 320 sends halftone data to the band buffer 330. Before storing the data to the band buffer 330, the data is masked. The band buffer manager 340 reversely masks data in the band buffer 330 in accordance with the data to be printed and then sends it to the print engine 350 for printing.

Figure 4:
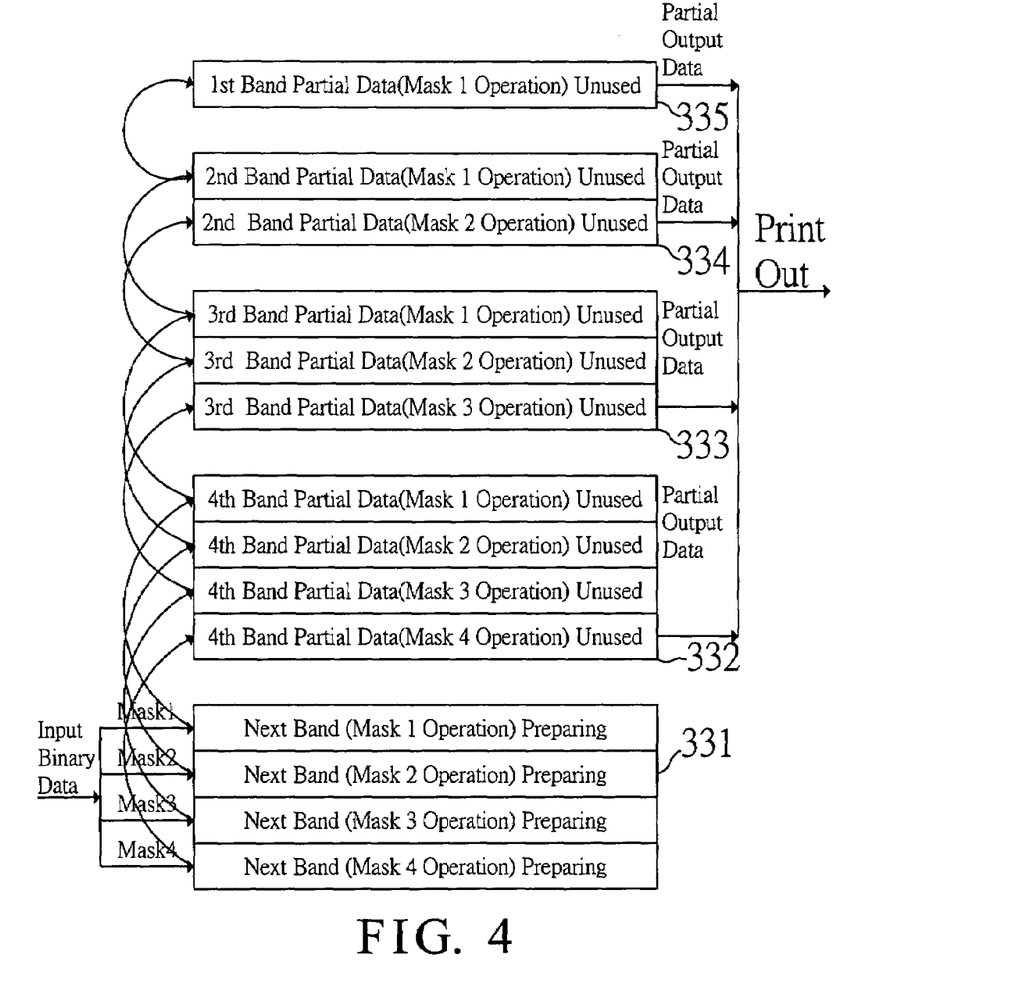
FIG. 4 is a block diagram of a band buffer of FIG. 3 in accordance with the invention.

FIG. 4 is a block diagram of a band buffer 330 of FIG. 3 in accordance with the invention. As shown, a four-pass print is given as an example. As shown in FIG. 4, the band buffer 330 consists of first to fifth sub-band buffers 331–335. Sub-band buffers 331 and 332 have a size of ¼ swath buffer each, sub-band buffers 333–335 have a respective size of 3/16, 2/16 and 1/16 swath buffer. After passing image processor 320, the data to be printed are performed with masking operation follows in accordance with the number of masks used by a multi-pass print. For example, for N-pass, N-time masking is processed independently to each other without any correlation. In each mask, only ¼ (1/N) mask elements are logic 1 and the remaining mask elements are logic 0, thus AND operation is performed only on the input data and a respective mask element with logic 1.

Figure 5:
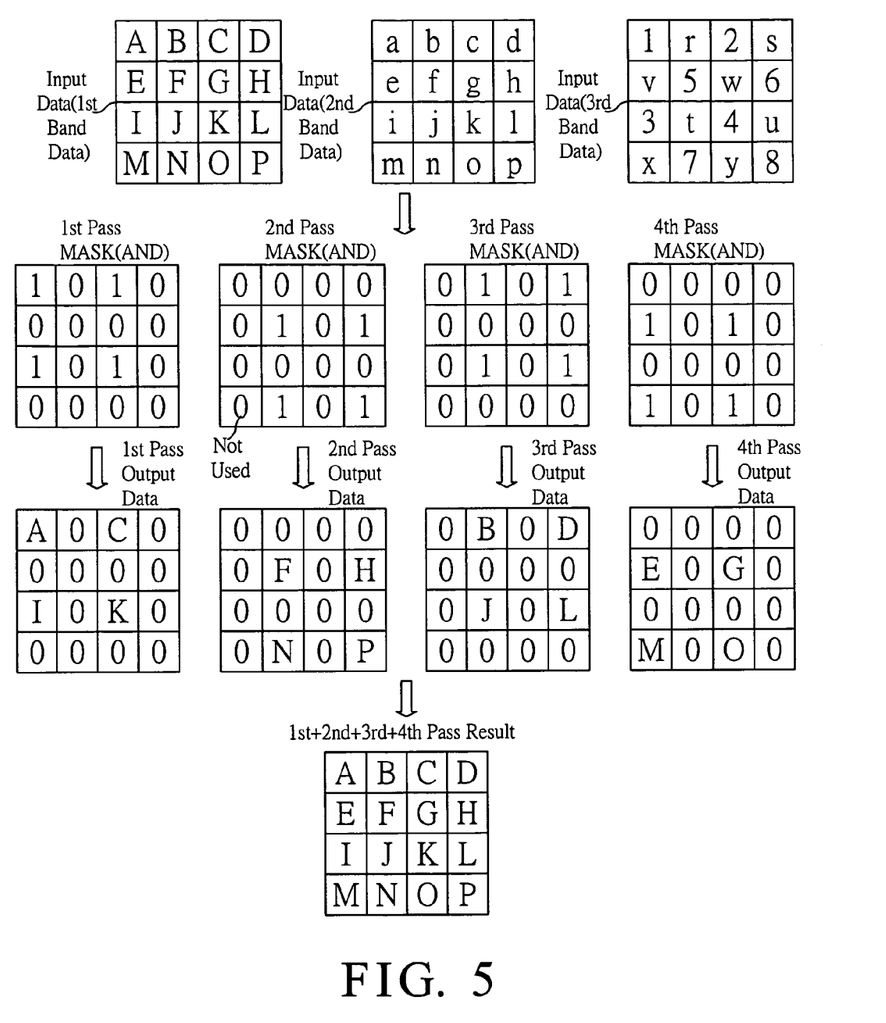
FIG. 5 shows a four-pass operation of input data and masks in accordance with the invention.
Figure 6:
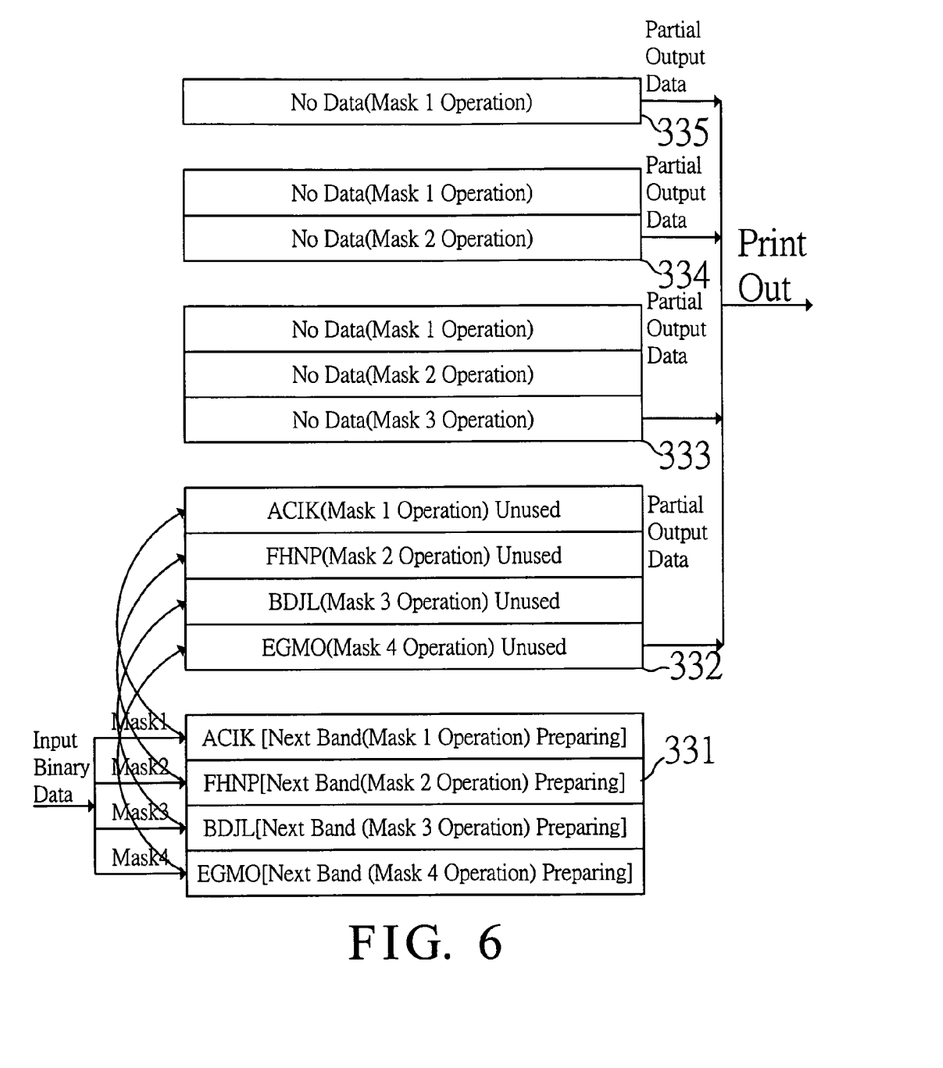
FIGS. 6–9 show data flows of FIG. 4 with a four-pass print in accordance with the invention.

FIG. 5 shows four-pass operation of input data and masks in accordance with the invention. The input data has a size of 4×4. A printer prints the four-pass result on a paper, wherein each pass has a respective mask to perform an AND operation on the printed input data. At first pass, an AND operation is performed on the input data and the respective mask, which results in partial input data of ACIK. At second pass, an AND operation is performed on the input data and the respective mask, which results in partial input data of FHNP. Similarly, the remainder of the input data is obtained at third pass and fourth pass respectively. At last, a four-pass result is obtained by combining all printing input data and thus the input data is printed completely.

Each of partial input data (masked data) is stored in a respective buffer such that for each pass, the respective buffer can be empty for another data store when the respective masked data is read and reconstructed to the respective original data, thereby reducing required memory.

FIGS. 6–9 show data flows in the band buffer 330 with a four-pass print in accordance with the invention. The band buffer manager 340 applies a first band data 'ABCDEFGHIJKLMNOP' to first to fourth masks for masking operation, thereby respectively obtaining four masked data of 'ACIK', 'FHNP', 'BDJL', 'EGMO'. The four masked data is written in the first sub-band buffer 331 and copied to the second sub-band buffer 332. After the data copy is complete, the manager 340 signals the print engine 350 to print. In this case, the third to fifth sub-band buffers 333–335 have no data, so as to only data of EGMO is printed after the fourth mask is applied.

Figure 7:
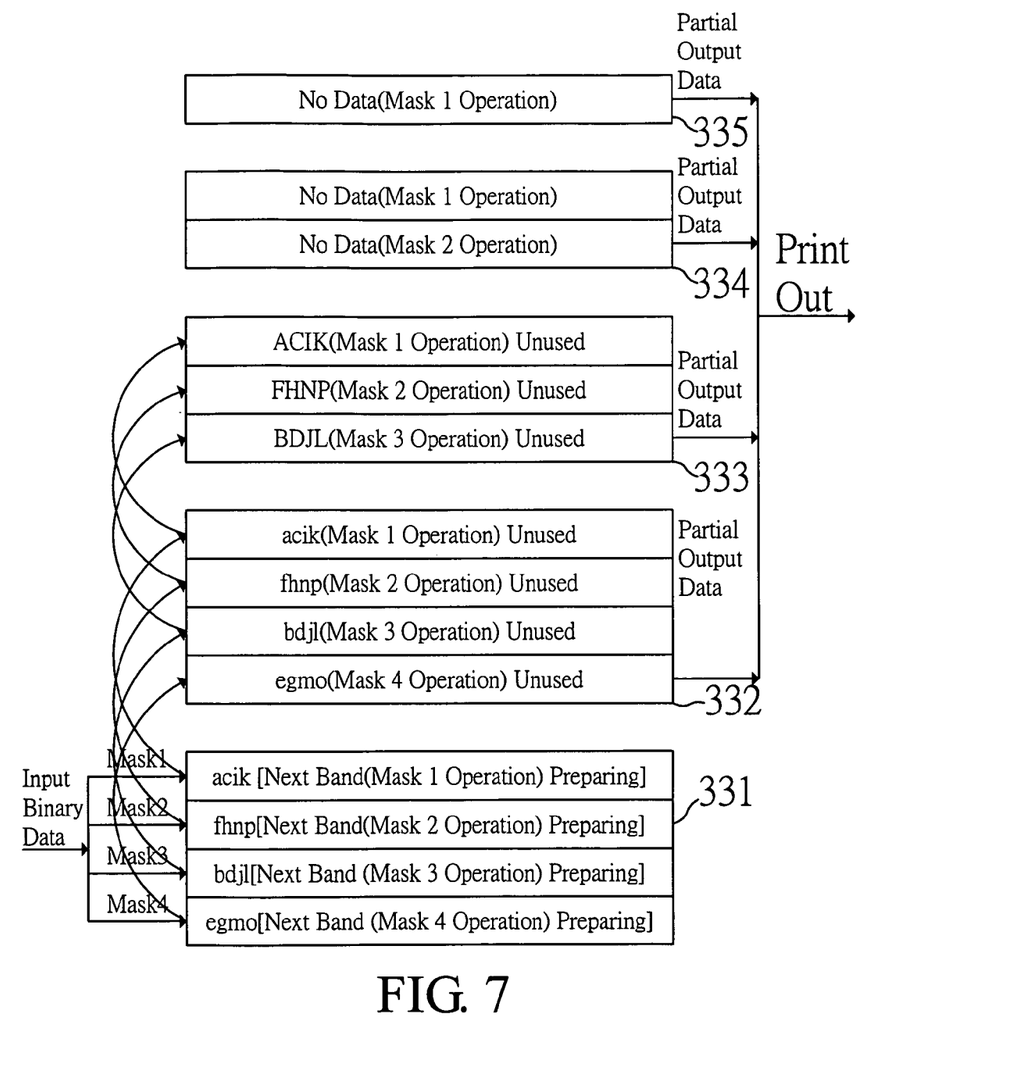

In FIG. 7, the manager 340 copies masked data of 'ACIK', 'FHNP', 'BDJL' that are not printed from the second sub-band buffer 332 to the third sub-band buffer 333 and also discards the data of EGMO printed. As such, the size of third sub-band buffer 333 can reduce 1/16 swath as compared to the size of second sub-band buffer 332.

Further, the band buffer manager 340 applies a second band data 'abcdefghijklmnop' to the first to fourth masks for masking operation, thereby respectively obtaining four masked data of 'acik', 'fhnp', 'bdjl', 'egmo'. The four masked data is written in the first sub-band buffer 331 and copied to the second sub-band buffer 332. After the data copy is complete, the manager 340 signals the print engine 350 to print. In this case, data of BDJL is printed that was masked by the third mask and data of 'egmo' is printed that was masked by the fourth mask.

Figure 8:
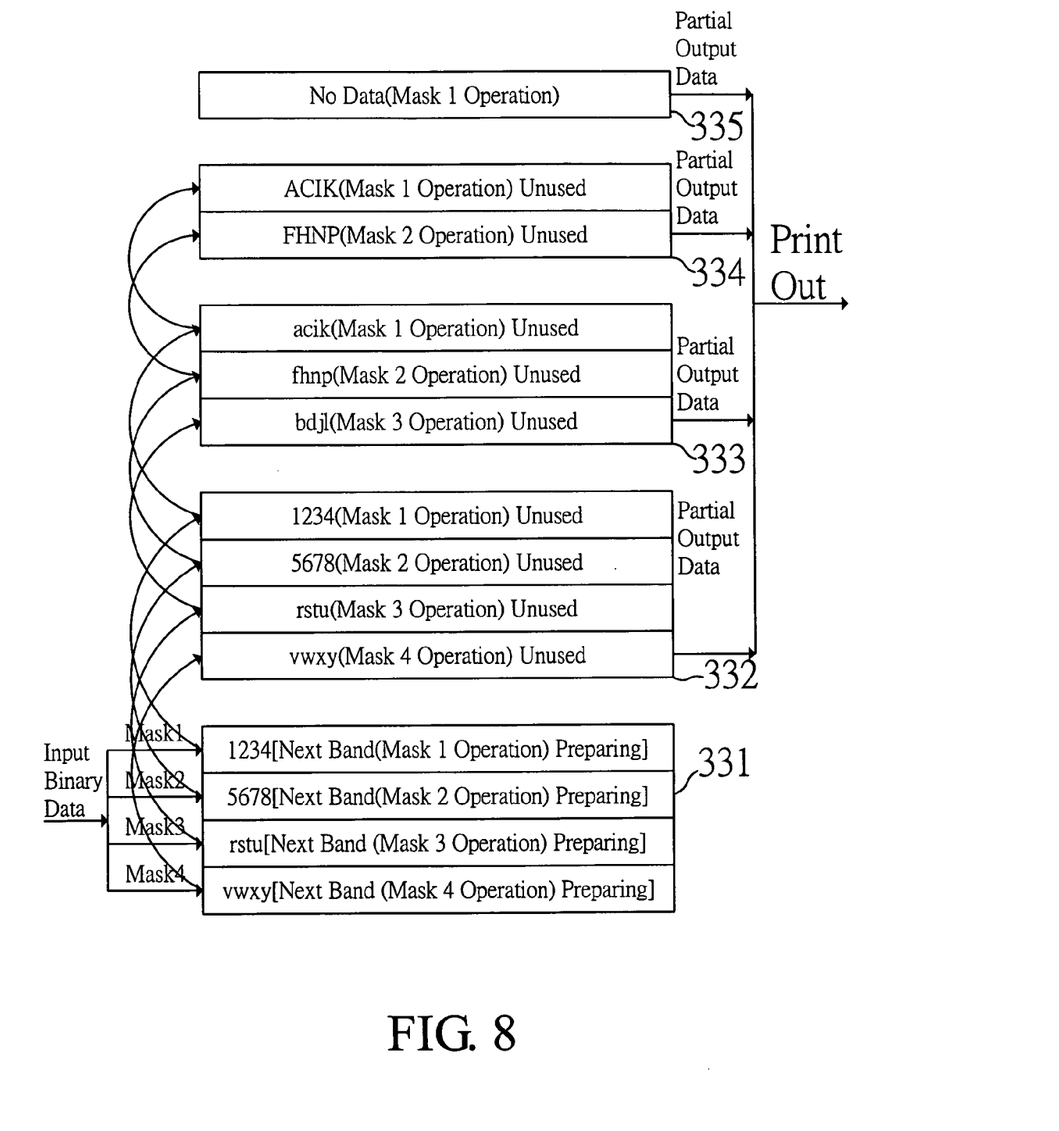

In FIG. 8, the manager 340 copies masked data of 'ACIK', 'FHNP' not printed from the third sub-band buffer 333 to the fourth sub-band buffer 334 and discards the data of BDJL printed. As such, the size of fourth sub-band buffer 334 can reduce 1/16 swath as compared to the size of third sub-band buffer 333. The manager 340 further copies masked data of 'acik', 'fhnp', 'bdjl' not printed from the second sub-band buffer 332 to the third sub-band buffer 333 and discards the data of egmo printed.

Further, the band buffer manager 340 applies a third band data '1r2sv5w63t4u7x8y' to the first to fourth masks for masking operation, thereby respectively obtaining four masked data of '1234', '5678', 'rstu', 'vwxy'. The four masked data is written in the first sub-band buffer 331 and copied to the second sub-band buffer 332. After the data copy is complete, the manager 340 signals the print engine 350 to print. In this case, data of 'FHNP' that is masked by the second mask is printed, data of 'bdjl' that is masked by the third mask is printed, and data of 'vwxy' that is masked by the fourth mask is printed.

Figure 9:
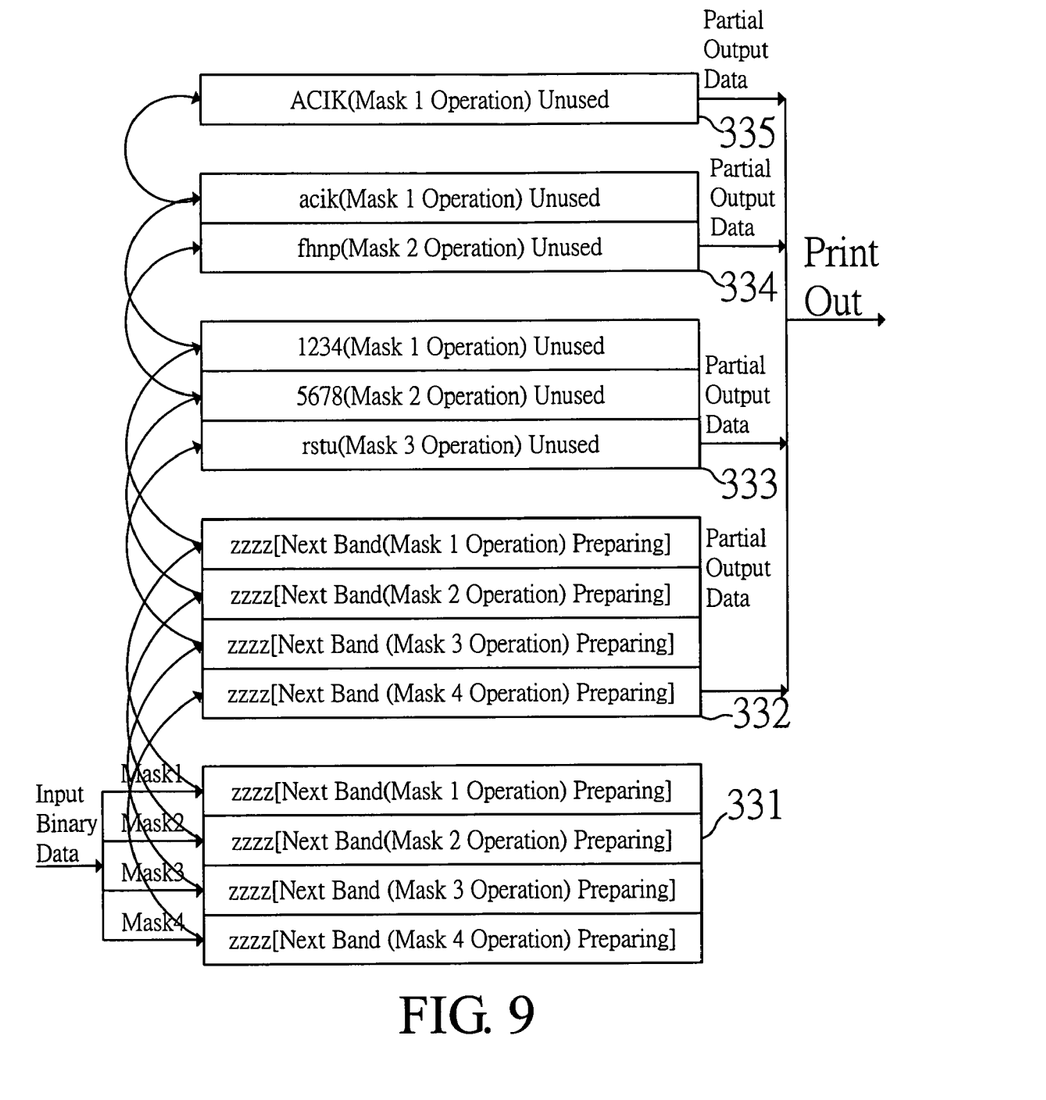

In FIG. 9, the manager 340 copies masked data of 'ACIK' that is not printed from the fourth sub-band buffer 334 to the fifth sub-band buffer 335 and discards the data of 'FHNP' printed. As such, the size of fifth sub-band buffer 335 can reduce 1/16 swath as compared to the size of fourth sub-band buffer 334. The manager 340 further copies masked data of 'acik', 'fhnp' from the third sub-band buffer 333 to the fourth sub-band buffer 334 and masked data of '1234', '5678', 'rstu' that are not printed from the sub-second band buffer 332 to the third sub-band buffer 333.

Further, the manager 340 applies a fourth band data 'zzzzzzzzzzzzzzzz' to the first to fourth masks for masking operation, thereby respectively obtaining four masked data of 'zzzz', 'zzzz', 'zzzz', 'zzzz'. The four masked data is written in the first sub-band buffer 331 and copied to the second sub-band buffer 332. After the data copy is complete, the manager 340 signals the print engine 350 to print. In this case, data of 'ACIK' of the first band data that is masked by the first mask is printed, data of 'fhnp' of the second band data that is masked by the second mask is printed, data of 'rstu' of the third band data that is masked by the third mask is printed, and data of 'zzzz' of the fourth band data that is masked by the fourth mask is printed. Such a printing can be continued in the same manner.

Figure 10:
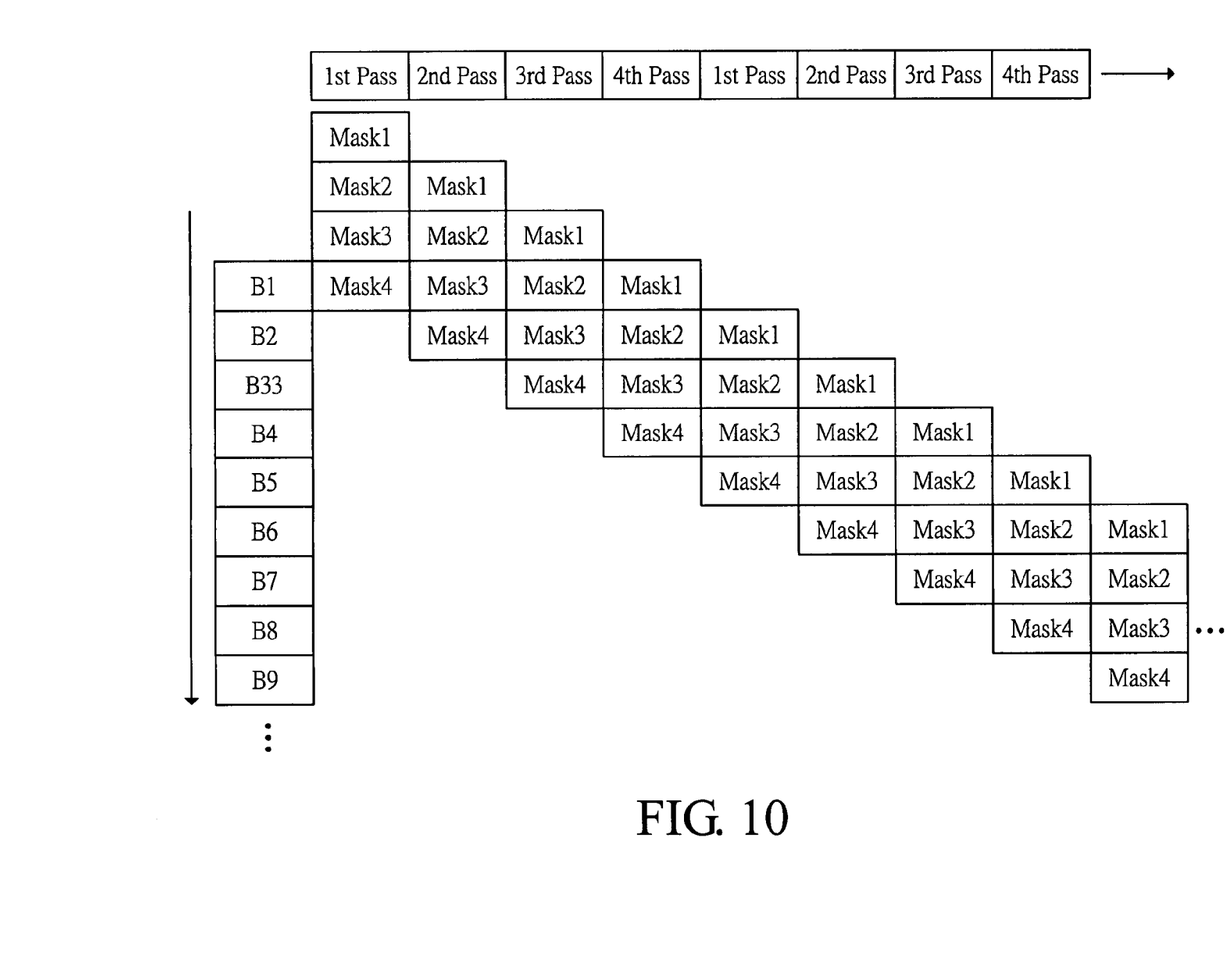
FIG. 10 shows a masking implementation on a four-pass print in accordance with the invention.

FIG. 10 shows a masking implementation on a four-pass print, which has different masks applied to different band data for each pass print. As shown in FIG. 10, the first pass prints the data of 'EGMO' obtained by applying the fourth mask to the first band data for masking operation. The second pass prints both the data of 'BDJL' obtained by applying the third mask to the first band data for masking operation and the data of 'egmo' obtained by applying the fourth mask to the second band data for masking operation. The third pass prints the data of 'FHNP' obtained by applying the second mask to the first band data for masking operation, the data of 'bdjl' obtained by applying the third mask to the second band data for masking operation, and the data of 'vwxy' obtained by applying the fourth mask to the third band data for masking operation. Similar operations are applied to the remaining data.

Figure 11:
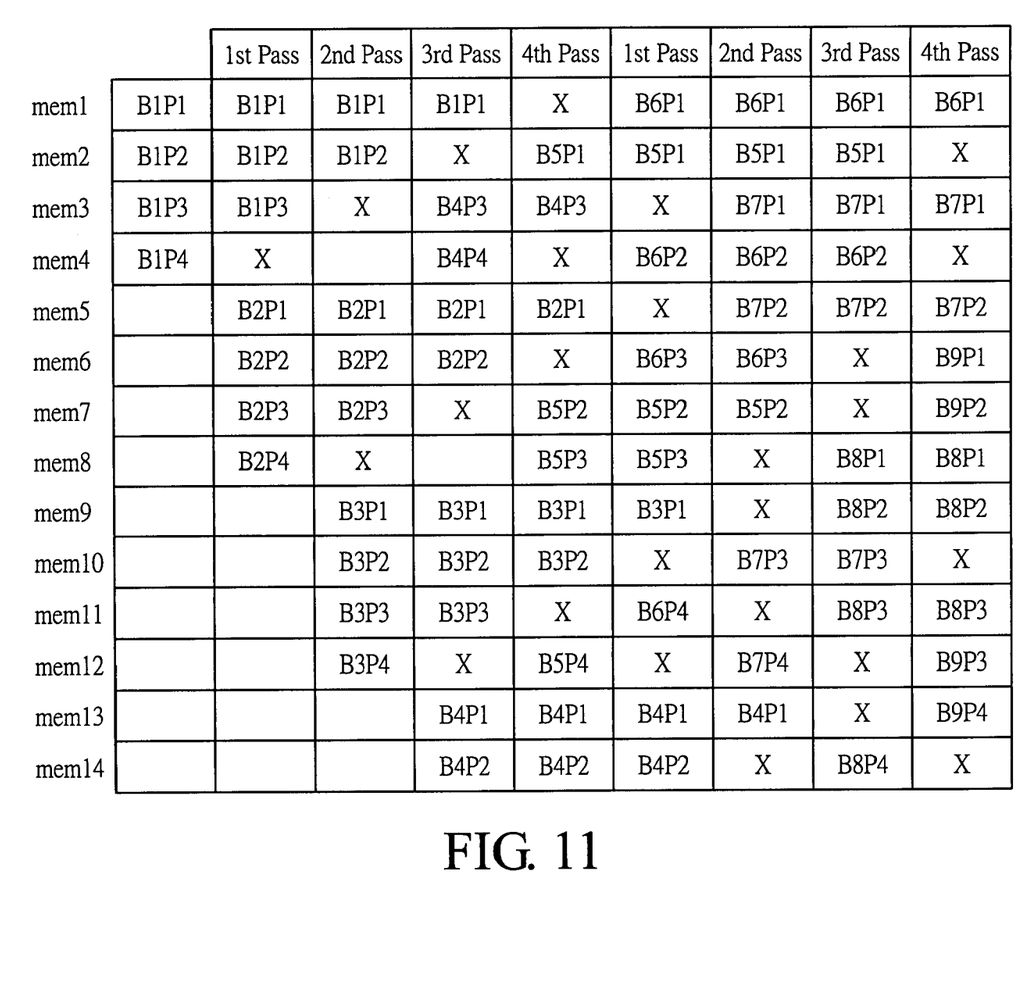
FIG. 11 shows a memory management applied in FIG. 10 in accordance with the invention.

FIG. 11 shows a memory management applied in FIG. 10. Upon analysis of FIG. 4, required buffer is a total size of $^{14}/_{16}$ swath buffer ($[1+2+3+4+4]/16=^{14}/_{16}$). Accordingly, a memory is divided into 14 equal parts (mem1 to mem14), each having a size of $^{1}/_{16}$ swath buffer, such that each band data is partitioned into P1 to P4 (such as notations of B1P1, B1P2, B1P3, B1P4) in accordance with the masks required by the passes when storing in the memory. In this case, the input data must be a unit of a band, which occupies four memory parts. For example, the first band data (i.e., notations of B1P1, B1P2, B1P3, B1P4) uses memory parts of mem1 to mem4 to input. As shown, data read status of each pass is represented in a horizontal direction, and X black represents a memory area has been released.

At first pass, only the first band data (B1P1, B1P2, B1P3 and B1P4) is ready to output. When outputting Pass 4 data (B1P4) of the first Band data (B1P4), the second band data (B2P1, B2P2, B2P3, B2P4) is also ready to output. Accordingly, at second pass, when outputting Pass 3 data (B1P3) of the first band data and Pass 4 data (B2P4) of the second band data, the third band data (B3P1, B3P2, B3P3, B3P4) is also ready to output.

At third pass, when outputting Pass 2 data (B1P2) of the first band data, Pass 3 data (B2P3) of the second band data and Pass 4 data (B3P4) of the third band data, the fourth band data (B4P1, B4P2, B4P3, B4P4) is also ready to output. However, the fourth band data has to be stored in previous used memory, e.g., mem3 and mem4 in this embodiment, thereby achieving memory use efficiency. The remainders on memory management are alike.

Figure 12:
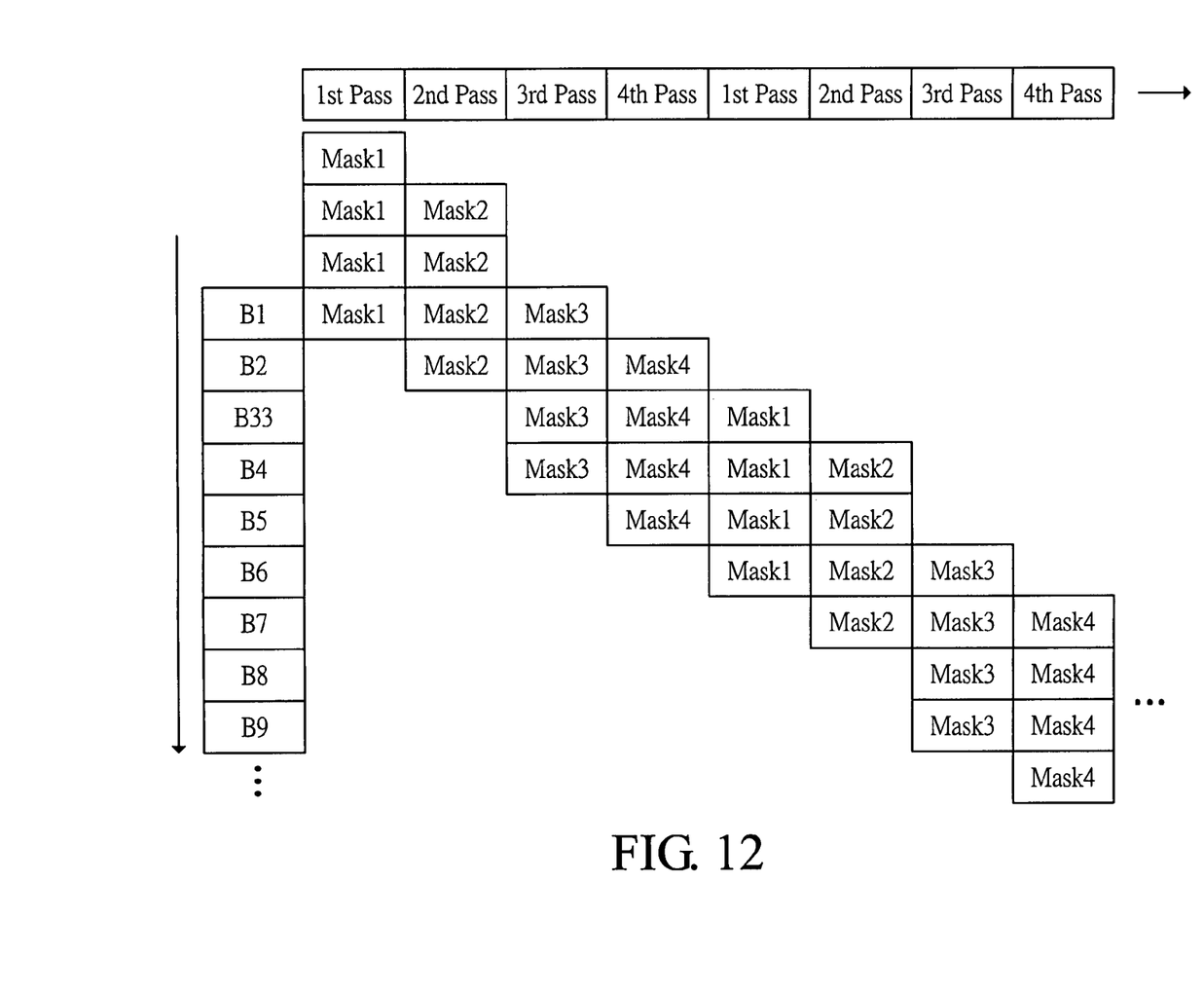
FIG. 12 shows another masking implementation on a four-pass print in accordance with the invention.

FIG. 12 shows another masking implementation on a four-pass print, wherein different passes have respective masks and accordingly each band data is masked based on the passes. As shown, at first print, data of 'ACIK' obtained by applying the first mask to the first band data for masking operation is printed. At second print, both data of 'BDJL' obtained by applying the second mask to the first band data for masking operation and data of 'fhnp' obtained by applying the second mask to the second band data for masking operation are printed. At third print, data of 'FHNP' obtained by applying the third mask to the first band data for masking operation, data of 'bdjl' obtained by applying the third mask to the second band data for masking operation, and data of 'rstu' obtained by applying the third mask to the third band data for masking operation are printed. The remainders are alike.

Figure 13:
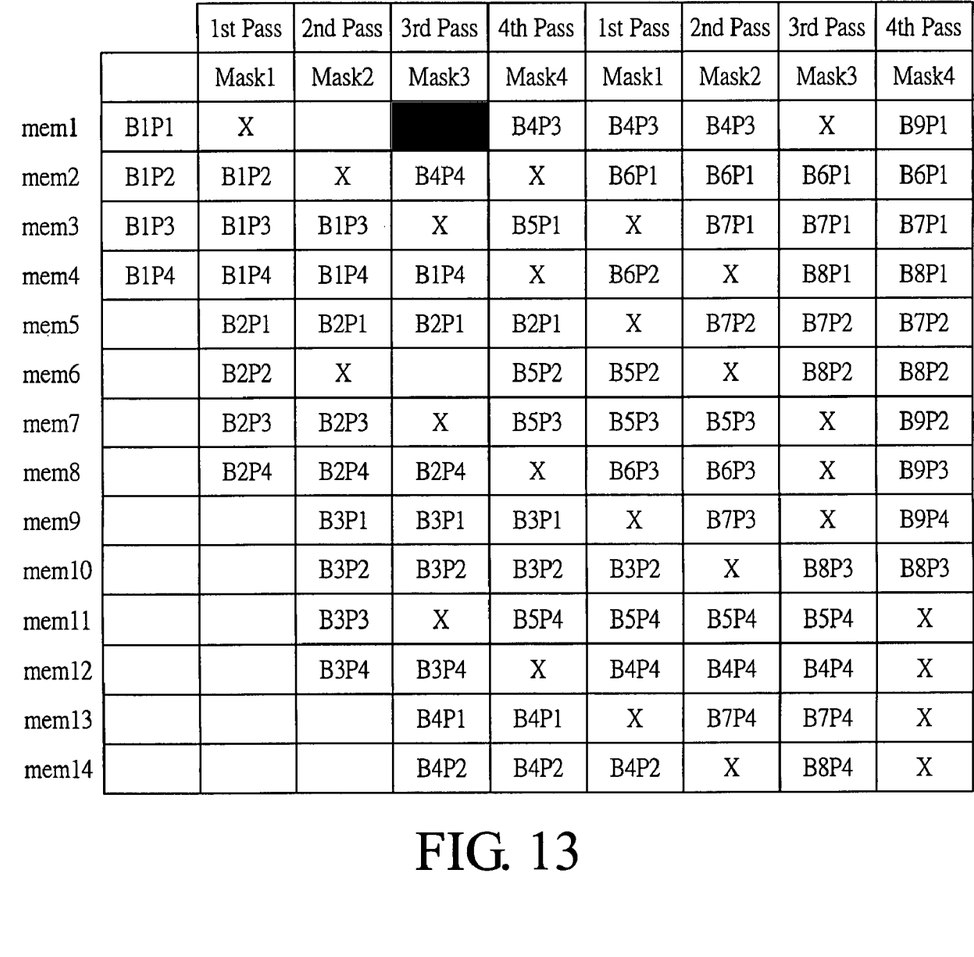
FIG. 13 shows a memory management applied in FIG. 12 in accordance with the invention.

FIG. 13 shows a memory management applied in FIG. 12. Upon analysis of FIG. 4, required buffer is a total size of $^{14}/_{16}$ swath buffer ($[1+2+3+4+4]/16=^{14}/_{16}$). Accordingly, a memory is divided into 14 equal parts (mem1 to mem14), each having a size of $^{1}/_{16}$ swath buffer, such that each band data is partitioned into P1 to P4 (such as notations of B1P1, B1P2, B1P3, B1P4) in accordance with the masks required by the passes when storing in the memory. In this case, the input data must be a unit of band, which occupies four memory parts. For example, the first band data (i.e., notations of BIP1, B1P2, B1P3, B1P4) uses memory parts of mem1 to mem4 to input. In the figure, data read status of each pass is represented in a horizontal direction, and X black represents a memory area has been released At first pass, only the first band data (B1P1, B1P2, B1P3 and B1P4) is ready to output. When outputting Pass 1 data (B1P1) of the first Band data (B1P4), the second band data (B2P1, B2P2, B2P3, B2P4) is also ready to output. Accordingly, at second pass, when outputting Pass 2 data (B1P2) of the first band data and Pass 2 data (B2P2) of the second band data, the third band data (B3P1, B3P2, B3P3, B3P4) is also ready to output.

At third pass, when outputting Pass 3 data (B1P3) of the first band data, Pass 3 data (B2P3) of the second band data and Pass 3 data (B3P3) of the third band data, the fourth band data (B4P1, B4P2, B4P3, B4P4) is also ready to output. However, Pass 3 and Pass 4 data in the fourth band data has to be stored in previous used memory, e.g., mem1 and mem2 in this embodiment, thereby achieving memory use efficiency. The remainders on memory management are alike.

The invention is described in a given example of 4-pass for bettering understanding, not for limit, and accordingly required buffer is a total size of $^{14}/_{16}$ swath buffer ($[1+2+3+4+4]/16=^{14}/_{16}$). Therefor, the invention can also be applied for other multi-pass prints such as 6-pass and 8-pass prints. Required buffer for a 6-pass print is a total size of $^{27}/_{36}$ swath buffer ($[1+2+3+4+5+6+6]/36=^{27}/_{36}$). Required buffer for an 8-pass print is a total size of $[1+2+3+4+5+6+7+8+8]/64=^{44}/_{64}$ swath buffer.

In view of the foregoing, the invention discards printed data, other than stored in the prior art until four passes are complete. Accordingly, the invention has more efficient management method of buffer than the prior art, and thus hardware cost is relatively reduced.

Although the present invention has been explained in relation to its preferred embodiment, it is to be understood that many other possible modifications and variations can be made without departing from the spirit and scope of the invention as hereinafter claimed.

What is claimed is:

1. A memory use and management method for a multi-pass printer having one complete print pass for input data through multi-pass, the method comprising:

a data receiving step, which receives input data to be printed through an interface;

a masking step, which uses a mask to mask the input data received by the printer, thereby generating a masked data;

a buffering step, which buffers the masked data, thereby forming a buffering data;

a print starting step, which starts to print the buffering data when having appropriate amount for one pass print by a printhead of the printer;

a reverse masking step, which reconstructs the buffering data to the input data for print in accordance with the mask used in the masking step; and a data excluding step, which excludes the buffering data that is reconstructed and printed in the reverse masking step, and returns to the data receiving step to perform continuously until all data is printed completely.

2. The method as claimed in claim 1, wherein the masking steps performs j masking operations respectively with different masks, as the multi-pass indicates j-pass, where j is a positive integer and indicates partitioned number of one complete print.

3. The method as claimed in claim 2, wherein for the j-pass, an amount of the buffering data is represented by $[(1+2+3+ \ldots +j+j)/(i*j)]*S$, where j is a positive integer and indicates partitioned number of one complete print pass, and S is data amount required by one complete print pass.

* * * * *